INVENTOR.
ROBERT J. GARLAND
BY  Herman Seid
ATTORNEY

Sept. 25, 1962　　　R. J. GARLAND　　　3,055,082
FINNING MACHINE

Filed March 31, 1955　　　　　　　　　　　　11 Sheets-Sheet 3

*INVENTOR.*
ROBERT J. GARLAND

BY　*Herman Seid*

ATTORNEY

Sept. 25, 1962 R. J. GARLAND 3,055,082
FINNING MACHINE
Filed March 31, 1955 11 Sheets-Sheet 4

INVENTOR.
ROBERT J. GARLAND
BY
ATTORNEY

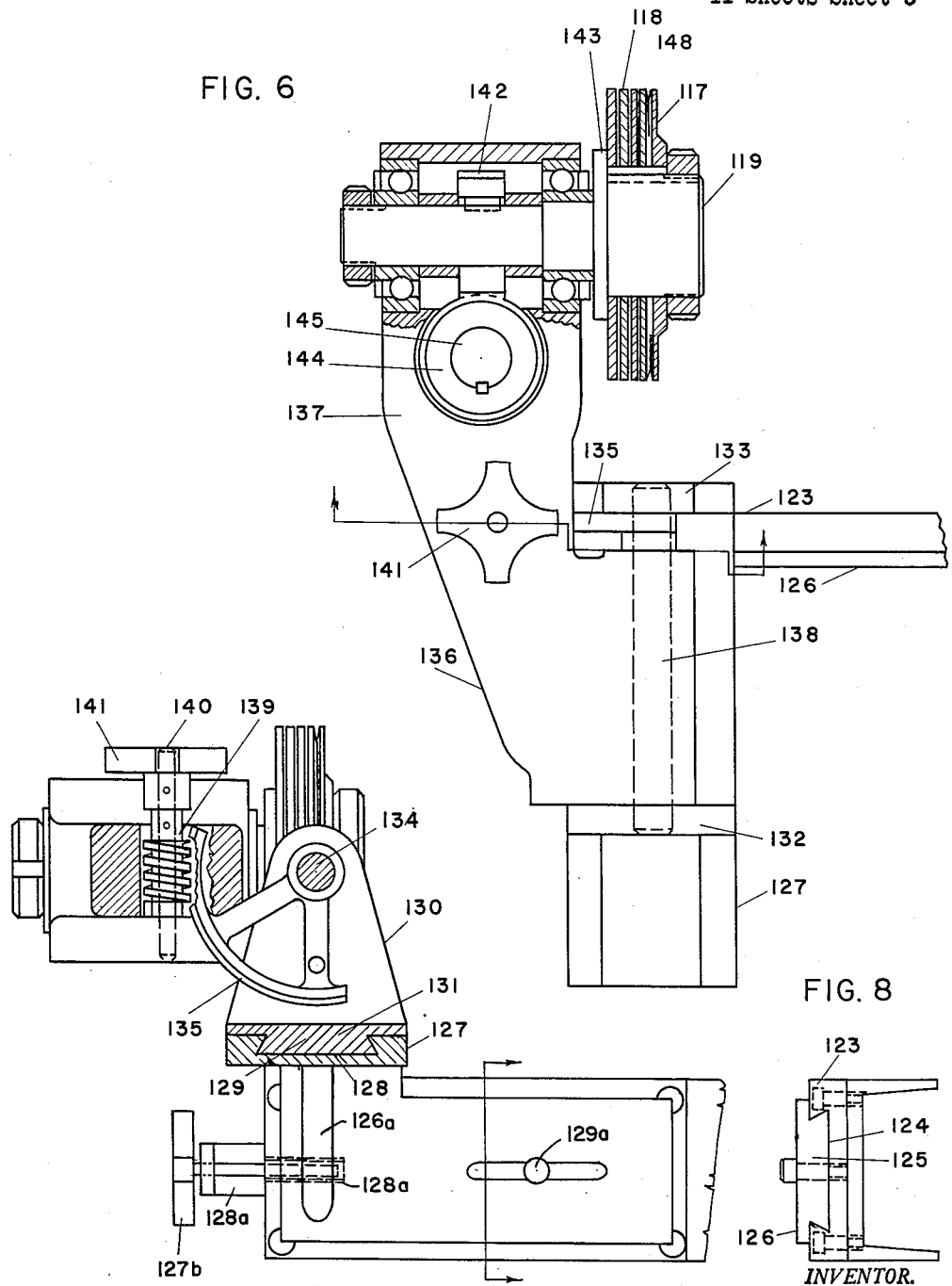

Sept. 25, 1962 R. J. GARLAND 3,055,082
FINNING MACHINE

Filed March 31, 1955 11 Sheets-Sheet 6

*INVENTOR.*
ROBERT J. GARLAND
BY Herman Seid

ATTORNEY

Sept. 25, 1962   R. J. GARLAND   3,055,082
FINNING MACHINE

Filed March 31. 1955   11 Sheets-Sheet 7

*INVENTOR.*
ROBERT J. GARLAND
BY  *Herman Seid*

ATTORNEY

Sept. 25, 1962  R. J. GARLAND  3,055,082
FINNING MACHINE

Filed March 31, 1955  11 Sheets-Sheet 8

INVENTOR.
ROBERT J. GARLAND
BY *Herman Seid*
ATTORNEY

Sept. 25, 1962 R. J. GARLAND 3,055,082
FINNING MACHINE
Filed March 31, 1955 11 Sheets-Sheet 9
FIG. 16
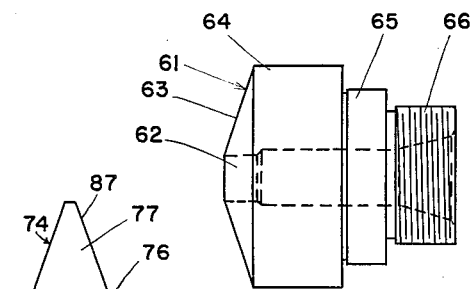
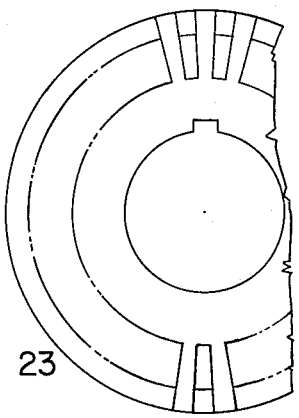
FIG. 23
FIG. 24
FIG. 19
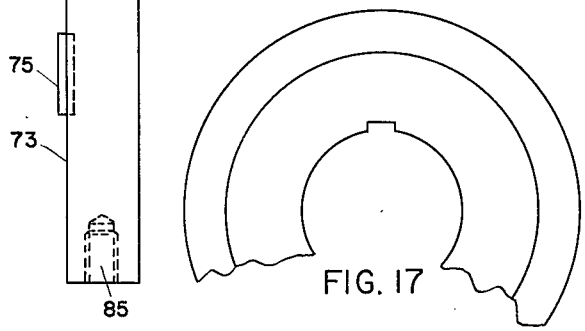
FIG. 17
FIG. 18
FIG. 15
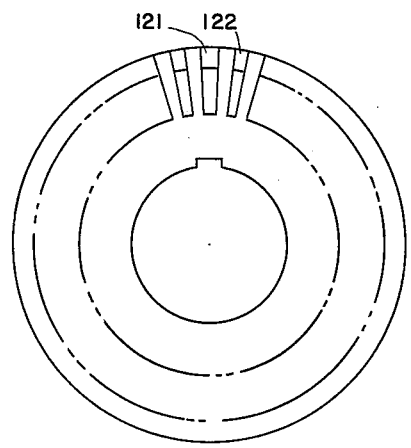
FIG. 20
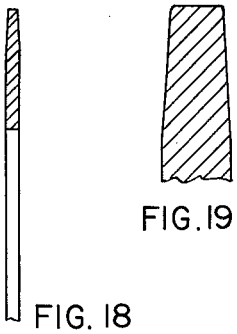
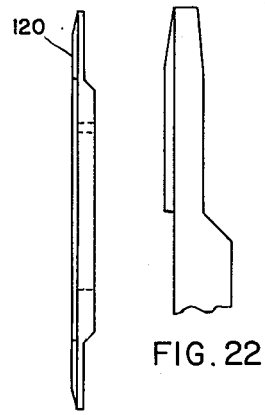
FIG. 22
FIG. 21
*INVENTOR.*
ROBERT J. GARLAND
BY *Herman Seid*
ATTORNEY Sept. 25, 1962    R. J. GARLAND    3,055,082
FINNING MACHINE Filed March 31, 1955    11 Sheets-Sheet 10

INVENTOR.
ROBERT J. GARLAND
BY
ATTORNEY

Sept. 25, 1962 R. J. GARLAND 3,055,082
FINNING MACHINE
Filed March 31, 1955 11 Sheets-Sheet 11

INVENTOR.
ROBERT J. GARLAND
BY *Herman Seid*
ATTORNEY

United States Patent Office 3,055,082
Patented Sept. 25, 1962

3,055,082
FINNING MACHINE
Robert J. Garland, De Witt, N.Y., assignor to Carrier Corporation, Syracuse, N.Y., a corporation of Delaware
Filed Mar. 31, 1955, Ser. No. 498,162
6 Claims. (Cl. 29—33)

This invention relates generally to apparatus for and a method of assembling a sheet metal strip in ribbon form about the outer surface of a tube to form a spirally wound fin thereon. Specifically, this invention relates to machinery for securing a thin metallic ribbon about a tube, such apparatus being known generally as finning machinery.

Tubular members having a metallic fin of the kind described assembled about the outer surface thereof are used extensively in equipment such as coils in refrigeration systems where it is required that an exchange of heat occur. In a condenser coil of a refrigeration system, for example, a medium such as a refrigerant in a gaseous state may flow through the tubes and a cooling agent such as air may be passed over the outer surface of the finned tubing. The presence of the fins, formed from a material having a high rate of heat conductivity, on the outer surface of the tube enables the cooling action to be accomplished more effectively because the heat of the medium within the tubes is transferred by conduction to the extended surfaces defined by the fins. This arrangement permits an efficient distribution of the heat involved, enabling the cooling agent to function more effectively.

In manufacturing finned tubing it is important that a firm union exist between the fin and the outer surface of the tube so the heat of the medium within the tube may be conducted efficiently to the fin. Also, certain economies may be obtained by employing relatively thin fins through a saving in material. Further in some instances it may be desirable to form a fin on the tube that is free from wrinkles or other such physical characteristics that would offer resistance to the flow of the cooling agent.

In machines for assembling the metallic fin about the tubes, there is usually provided a mechanism for simultaneously advancing and rotating the tube to a first work station where the sheet metal ribbon in strip form is passed between power driven forming rolls designed to stretch the outer edge of the ribbon to curl the ribbon into a helical coil and direct it about the outer surface of the tube, then to a second station spaced closely to the first station where a set of straightening rolls remove any waves or wrinkles that may have been formed in the previous operation from the surface of the fin and also space the individual turns of the fin. Heretofore considerable difficulty has been experienced in coordinating the movement of the tube advancing and rotating means, the movement of the forming rolls and the movement of the straightening disks. It is accordingly the chief object of this invention to provide a finning machine wherein the mechanism for advancing and rotating the tube is eliminated and the tube derives its movement from the action of a rotating disk assembly functioning in a manner similar to the straightening rolls.

One of the difficulties involved in the provision of such a desired machine is the problem offered by the use of metal fin stock of extreme thinness. To achieve efficiency in the heat exchange unit it is desirable to provide a finned structure with metallic fins having a relatively small thickness with the fins spaced longitudinally along the tube and having a pitch that will assure an efficient transfer of heat.

Another object of the invention is to provide a finned tube for use as a heat exchanger wherein the fin is formed so as to be wrinkle free and easily assembled about the tube in a manner to permit a substantial number of fins per inch along the tube. This object is attained by subjecting the sheet metal ribbon to a pair of forming rolls, constructed to distort the ribbon in a certain manner that includes elongating it longitudinally throughout its width, the actual extent of elongation varying throughout the width for any given section of the ribbon. The forming rolls further provide the ribbon with a configuration that includes a tube engaging edge on the fin.

A still further object of the invention is the provision of improved forming rolls of the type which distort the flat ribbon prior to its assembly about the tube, which improvement prevents over distortion or over stretching of the type preventing easy assembly of the formed ribbon about the tube. One purpose of the forming rolls is to change the form of the metallic ribbon stock to a curled form. The curled ribbon is then formed about the tube with one edge thereof in engagement with the outer surface of the tube in a continuous operation, thus producing the spiral fin. Normally the helical configuration is produced by longitudinally elongating one edge portion of the ribbon, so the ribbon curls about the other edge portion. It is preferred that the individual convolutions formed by the formed helical ribbon define a series of concentric circles. If the circles are non-concentric, a condition caused by over-stretching or over-elongating in the forming rolls, the coiled ribbon may have to be contracted when it is fitted about the tube to form the fin thereon. This contraction in turn causes the fin to become wavy or undulated. When the fin is formed with a wave or is wrinkled, it will be obvious that any given segment of the fin will contain more material than a corresponding segment of a fin having a plane surface. This undesirable condition becomes important when the fin passes through a plurality of nips formed by the series of spaced rotating disks where it is secured to the tube as well as properly spaced longitudinally thereof. As will be described later in detail the metallic ribbon forming the fin is further elongated so as to bind the inner or tube engaging edge of the fin to the tube. Further elongation of a segment of the fin which already has an excess of material prevents the formation of a fin that has a substantially vertical disposition throughout its height to the axis of the tube because the excess material after being subjected to the action of the rotating disk assembly, tends to distribute itself proximate the tube engaging foot of the fin so that when viewed in section the fin gradually approaches a vertical disposition as opposed to an abrupt approach as obtained by this invention.

A further object of the invention is the provision of heat exchange apparatus of the type contemplated wherein the fin construction formed by the apparatus disclosed permits efficient heat transfer. It is known that efficient heat transfer action in finned coil heat exchange units is obtained when a fin having a predetermined cross section is employed. Essentially the heat transfer characteristics are related to the relationship between the height of the fin and the width of the fin. The invention herein described provides a fin which substantially approximates this preferred relationship.

Briefly the invention contemplates apparatus having an operating assembly adapted to guide a tube through a predetermined path, and to support the forming roll mechanism as well as the rotating disk assembly for spacing and securing the fins along the surface of the tube. The operating assembly mounts the forming rolls one of which has an axial tube accommodating bore terminating at the ribbon or work engaging face of the roll. The bore is in registry with an axial bore in a hollow member extending through the operating assembly so that metallic ribbon, distorted by the forming rolls, to assume a helical configuration, tends to curl about the tube as the tube moves through the aligned bores. A formed ribbon guide member assists in directing the helical ribbon about the surface of the tube. The outer portions of the fin are then further distorted as the fin passes through the multiple rotating disk assembly causing additional elongation of the outer edge of the fin which in turn induces in the opposite or tube engaging edge of the fin, a force tending to create a frictional gripping action between the fin and the tube of a magnitude sufficient to transmit the rotational movement of the disk assembly to the tube in such a manner as to also advance the tube, and sufficient to resist normal forces of the type encountered in handling the finned tubing, that might cause separation of the fin and the tube.

Other objects and advantages of the invention will be apparent upon a consideration of the ensuing specification and drawings wherein for the purposes of illustration, only one embodiment of the invention is described.

FIGURE 6 is a plan view of the rotating disk assembly and the mounting therefor.

FIGURE 7 is a side view of the rotating disk assembly.

FIGURE 8 is an end view illustrating the disk assembly mounting arrangement.

FIGURE 15 is a view, in elevation, of one of the forming rolls.

FIGURE 16 is a view, in elevation, of the other forming roll.

FIGURE 17 is a partial view of one of the rotating disks provided with a plane face.

FIGURE 18 is an enlarged view of a portion of the disk shown in FIGURE 17.

FIGURE 19 is an enlarged partial view showing the peripherical margin of the disk illustrated in FIGURES 17 and 18.

FIGURE 20 is a view, in elevation, of a modified form of a rotating disk.

FIGURE 21 is a side view of the disk illustrated in FIGURE 20.

FIGURE 22 is an enlarged detail view of the peripheral edge of the disk shown in FIGURES 20 and 21.

FIGURE 23 is a partial view of another form of rotating disk.

FIGURE 24 is a side view of the disk illustrated in FIGURE 23.

Figure 1:
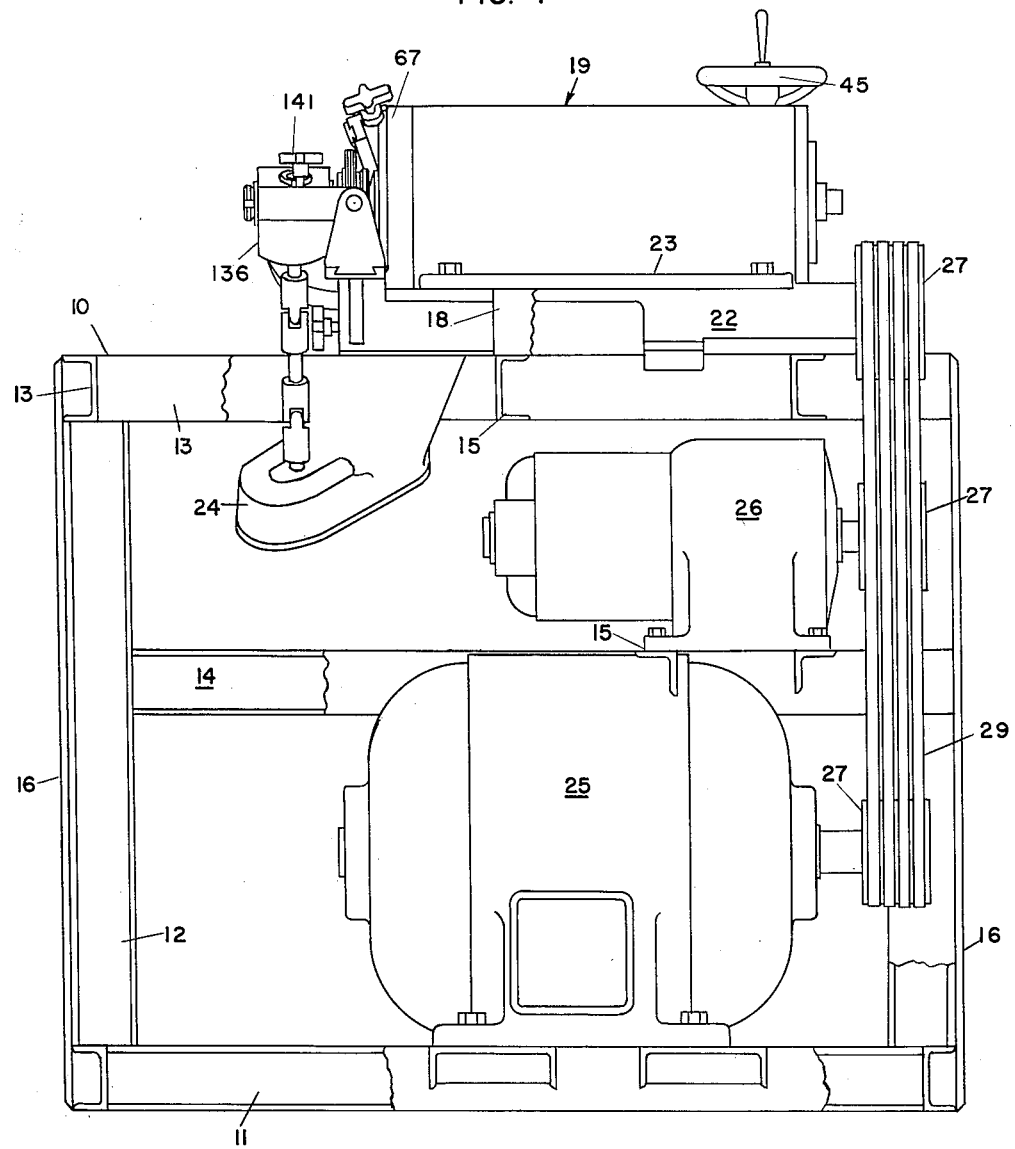
FIGURE 1 is a side view, with certain parts broken away for clarity, of a machine constructed in accordance with the invention.
Figure 2:
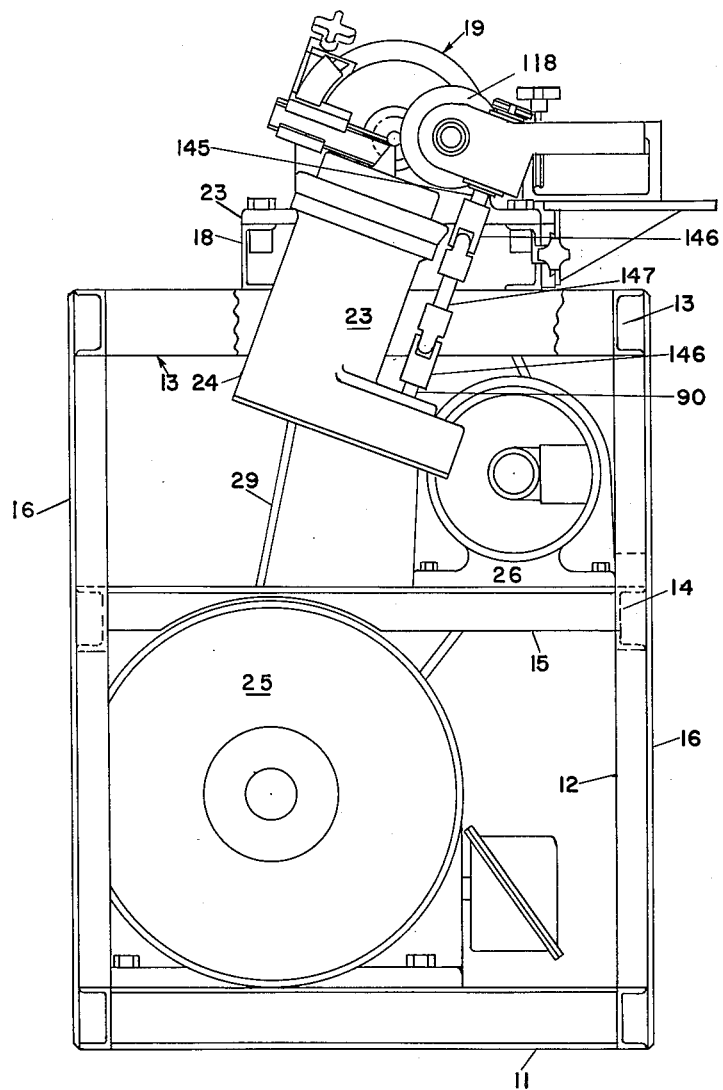
FIGURE 2 is an end view, with certain parts broken away for clarity, of the machine shown in FIGURE 1.
Figure 3:
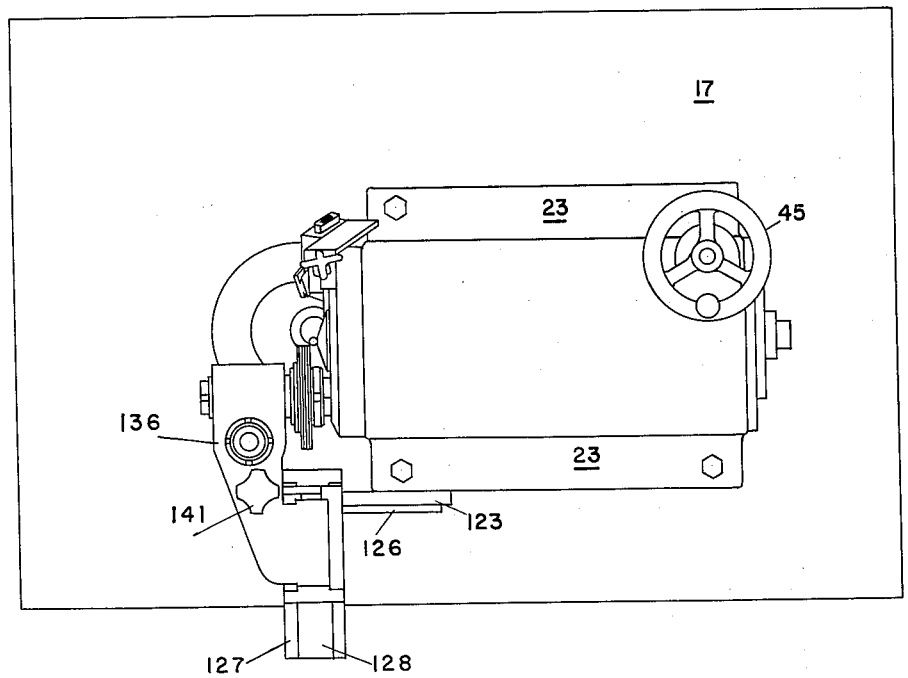
FIGURE 3 is a plan view of the machine shown in FIGURE 1.

A machine illustrating the invention is shown in the drawings wherein like reference numerals refer to similar parts. As shown in FIGURES 1 and 2 a supporting structure 10, composed of structural base members 11, connected at their ends so as to form a frame, corner post 12, extending upwardly from the frame, top members 13 secured to the ends of corner posts 12 remote from the base frame, intermediate members 14 connected to the corner posts, and cross members 15 extending transversely of the structure 10 serves to provide a stand. If desired panels 16 may be provided to form an enclosure for the framework described. For convenience the structural members disclosed are shown in the form of conventional channel irons; however, other constructions may be used. A top cover member 17 having a cut out portion to accommodate portions of the machine is supported on the top of members 13.

Secured to the uppermost cross members 15 are a pair of spaced supporting elements 18, also in the form of channel irons. The function of these elements is to provide a suitable mounting for the operating assembly 19 which in turn includes mechanism for guiding a tube through a substantially linear path as the sheet metal ribbon is wound about the external surface thereof, and for supporting the various drive elements for furnishing a predetermined, correlated type of movement to the forming rolls and the tube rotating and advancing and ribbons securing disk assembly in a manner to be later described. Essentially the operating assembly includes a housing 20, in the form of a casting which includes an upper section 21, a lower section 22, and extending wing portions 23. The housing 20 is secured to the supporting elements 18 through the wing portions so that the lower section 22 extends below the upper surface of the elements 18 and the upper section 21 is positioned above the elements. In addition to the upper and lower sections there is provided a boot-like section 24 projecting downwardly at an angle to the other sections.

The cross braces 15, connecting the intermediate frame members 14 are arranged to form a support for a large prime mover 25 and a small prime mover 26. Secured to each of the power shafts of the two prime movers is a multi-grooved pulley 27.

The lower section 22 of housing 20 has rotatably mounted therein through conventional bearings a main drive shaft 28, one end of which extends beyond the housing and has secured thereto a multi-grooved pulley of the type mounted on the power shafts of the prime movers. Suitable belts 29 are assembled about the pulleys so that the shaft 28 is driven from either of the motors in a manner to be later described. Keyed to the other end of shaft 28 is a spur gear 30 adapted to mesh with gear 31 secured to roll drive shaft 32 which is journalled in bearings mounted in the section 21 of the housing as more clearly shown in FIGURE 5. A hollow elongated roll 33, having an opening 34 extending therethrough, is mounted within the member 32 for rotation therewith through a keyway 35. This arrangement permits the roll 33 to move longitudinally relative to the roll drive shaft 32 through mechanism to be later described while preventing relative rotational movement therebetween. Secured to the end of the member 32 remote from the end mounting gear 30 is a bevel gear 36.

Figure 4:
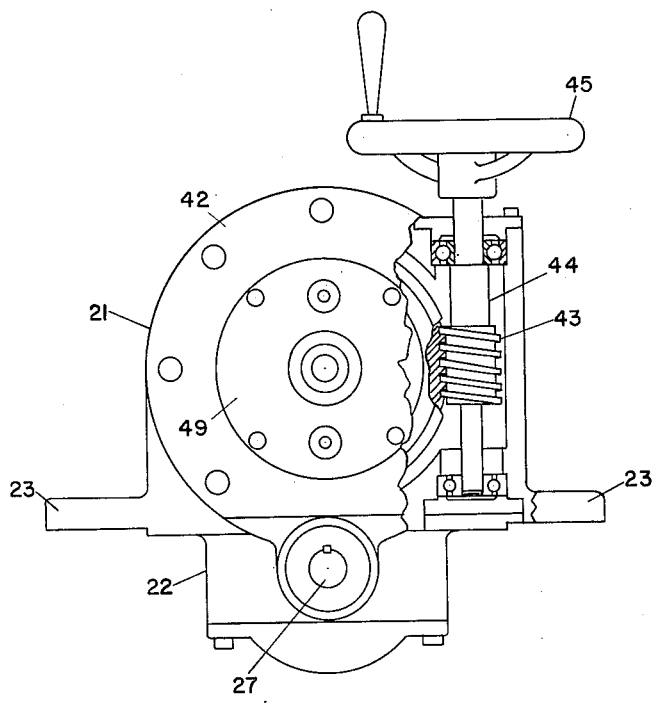
FIGURE 4 is an end view, with certain parts broken away for clarity, of a portion of the operating mechanism of the machine.

In order to move the roll 33 longitudinally with respect to its associated drive shaft 32, there is provided at one end thereof a portion of reduced dimension adapted to rotatably mount thereon an externally threaded hub member 37. Thrust bearing 38 is placed between the hub 37 and the shoulder formed by the reduced portion. Co-operating with the hub is an internally threaded ring member 39 having a worm gear 40 integrally formed about the outer surface. A key 41 is affixed to the inside of a housing cover plate 42 and projects into a longitudinal passage in the hub member so as to restrain rotational movement of the hub. Cover plate 42 is shown secured to the housing by conventional fastening means. Plate 42 includes an annular outer portion 50 and an inwardly projecting ring portion 51 integrally attached thereto. Retaining ring 52 is attached to the inner end of ring portion 51 to provide a bearing for the worm gear 40 and ring member 39. Members 42 and 52 serve to restrain the ring member 39 against axial movement. Co-operating with the gear 40 is a worm 43 secured to a shaft 44 rotatably mounted in the housing 20 as shown in FIGURE 4. An operating handle 45 is affixed to one end of the shaft 44, so as to permit manual manipulation of the worm 43 and gear 40.

Figure 5:
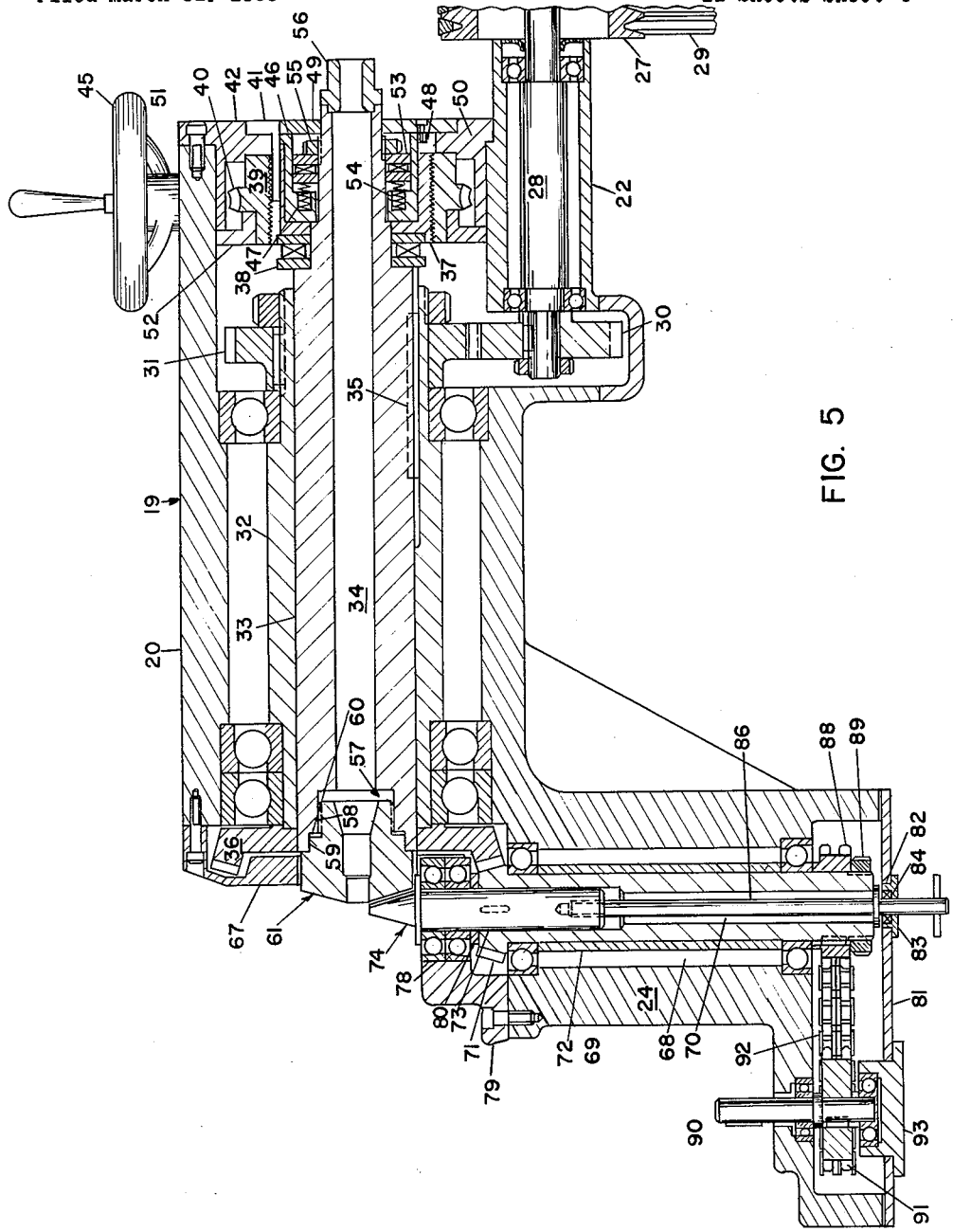
FIGURE 5 is a side view, in section, of the operating head of the finning machine constructed in accordance with the invention.

To prevent any incidental movement of the hollow roll 33 due to the tolerances between the threaded members 37 and 39, the hub 37 is provided with a counterbore for the accommodation of annular member 46 having spring receiving sockets 47 therein. The member 46 is generally Z-shaped in section with an outer flange 48 adapted to be connected to a plate 49 assembled within the cover plate 42 as shown in FIGURE 5. Thrust bearing 53 is assembled about a portion of the roll 33 that has a threaded section thereon. Retaining nut 55 maintains the parts in the position shown. The thrust bearing serves to confine, under compression, springs 54 which continuously urge the hub member and roll 33 to the right as shown in FIGURE 5. This action is, of course, resisted by the threads on member 39 in such a manner to overcome the normal thread tolerance.

It will thus be evident that movement of the worm 43 will effect movement of the member 33 through the co-operation of the hub and threaded ring members. Member 33 has secured to the end adjacent the mechanism described, tube guide 56 for directing the leading end of a tube into the longitudinal opening or passage 34.

The roll 33 has provided at the forward or left end as viewed in FIGURE 5, a socket 57 including a first portion 58 having a threaded surface and a second portion 59 in axial alignment therewith but of a larger diameter so as to form a shoulder 60. The socket 57 serves to accommodate a forming roll 61 having a differential opening 62, note FIGURE 16, a head portion 64 including a work engaging face 63 of a configuration to be later described, a central portion 65, smaller in diameter than the head portion and a threaded shank portion 66. The forming roll 61 is assembled in the member 37 by threading the shank portion into the socket, so that the axis of the forming roll is substantially horizontal. Cover plate 67 is secured to the end of housing 20.

As pointed out above the housing 20 of the operating assembly has integrally connected thereto, extending section 24 having a shaft supporting passageway 68, the axis of which is inclined to a vertical norm as shown in FIGURE 2. Journalled in the passageway 68 is gear shaft 69, having a differential opening 70 extending therethrough and a bevel gear 71 integrally formed on one end thereof and adapted to mesh with bevel gear 36 so that movement of the roll drive shaft 32 is transmitted to the member 69. Spacer sleeve 72 maintains the gear shaft bearings in the manner shown. The upper or larger portion of opening 70 receives shank portion 73 of forming roll 74 and has provided on its inner surface a groove for the reception of a key 75 on the outer surface of the shank 73 for transmitting rotational movement from shaft 69 to the form roll 74. An annular flange 76, note FIGURE 15, at the base of the head portion 77 of the form roll engages the inner races of bearings 78 which are supported in the cover 79 secured to the section 24 so as to prevent the downward movement of the form roll 74 in the opening 70. A spacer collar 80 is positioned between bearings 78 and gear 71. A plate 81 having an opening 82 therein is secured to the base or lower end of the section 24. The opening 82 accommodates a bearing support collar 83 having a lubrication seal 84 assembled therein. The shank portion 73 of the form roll has an internally threaded axial recess 85 extending from the end remote from the head portion 74 adapted to cooperate with a rod 86, having a threaded extremity, projecting through seal 84 and through opening 70 in gear shaft 69. The head portion 77 of form roll 74 has a conical work engaging face 87 adapted to cooperate with the work engaging face 63 of form roll 61 to cause a particular distortion of the sheet metal ribbon prior to its assembly about the tube in a manner to be later described. Secured to one end of the shaft 69 is a sprocket 88, maintained thereon by lock nut 89. Also mounted in section 24 of the housing 20 for rotational movement therein, is stub shaft 90 having a sprocket 91 secured to the lower end thereof. The two sprockets 88 and 91 are connected by chain 92 so that the rotational movement of shaft 69 is transmitted to shaft 90. Bearing retainer 93 is assembled in the cover plate 81 as shown in FIGURE 5.

During the operation of the machine a sheet metal ribbon is fed from a supply roll through a guide member into a nip defined by the work engaging faces of forming rolls 61 and 74 where it is subjected to distortion causing it to assume a generally helical configuration as it emerges from the nip. The ribbon is then directed over a formed ribbon guide member into engagement with the outer surface of the tube. From there the ribbon passes between one or more nips defined by a plurality of axially spaced rotating disks. One function of the disk assembly is to cause the tube engaging edge of the ribbon to firmly adhere to the surface of the tube so that movement of the disks transmit motion to the tube through the spirally wound ribbon or fin. Another function is to determine the final pitch of the helically or spirally wound fin about the surface of the tube. The manner in which the disk assembly achieves these functions will be described later.

Figure 11:
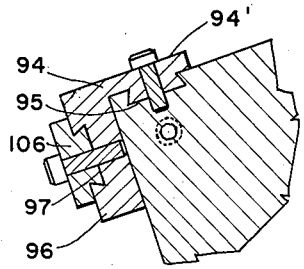
FIGURE 11 is a detail of the ribbon guide bracket member of the guide assembly.
Figure 9:
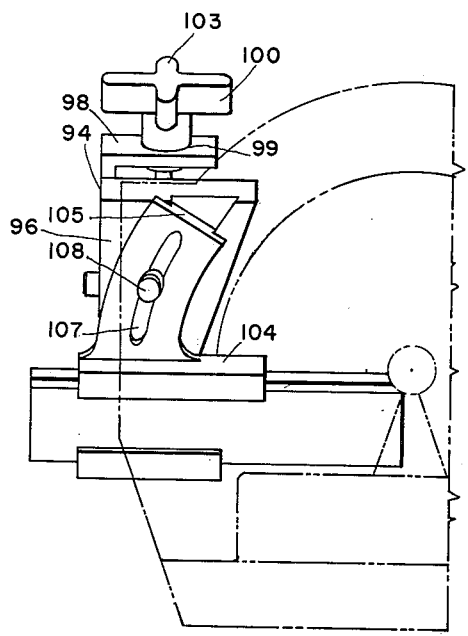
FIGURE 9 is a side view of the ribbon feed guide assembly.
Figure 10:
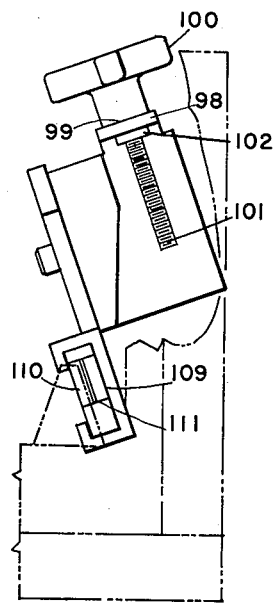
FIGURE 10 is an end view of the ribbon feed guide assembly.
Figure 12:
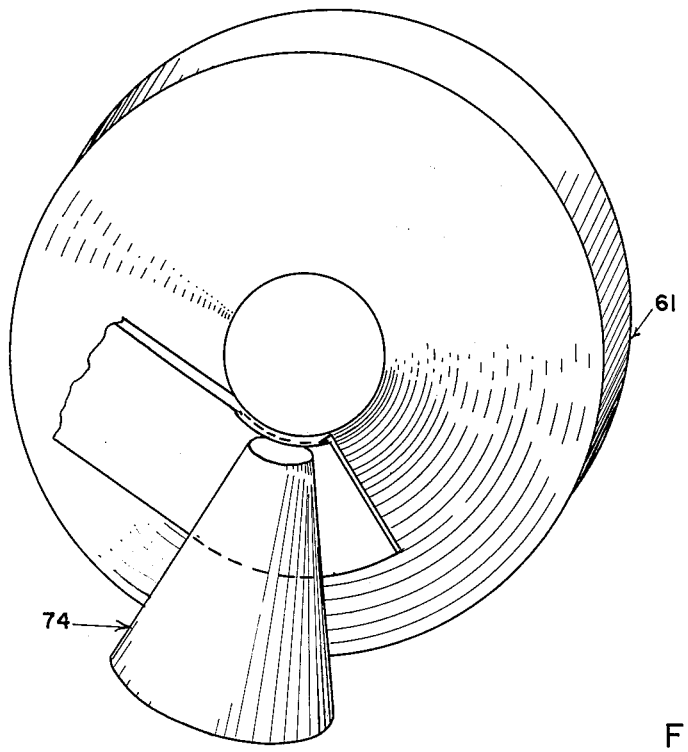
FIGURE 12 is a somewhat schematic view illustrating the action of the forming rolls on the ribbon.
Figure 13:
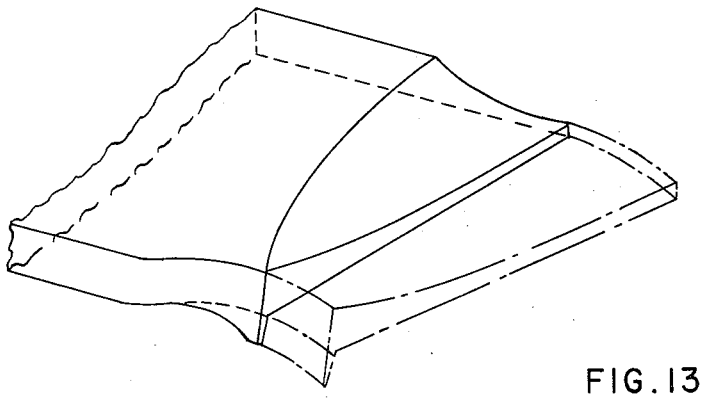
FIGURE 13 is an enlarged isometric view of the ribbon with the foot of tube engaging edge of the ribbon exaggerated.
Figure 29:
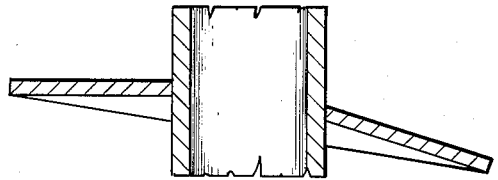
FIGURE 29 is a view in section taken along lines 29—29 on FIGURE 28 showing another view of the disposition of the formed ribbon guide with respect to the tube.
Figure 28:
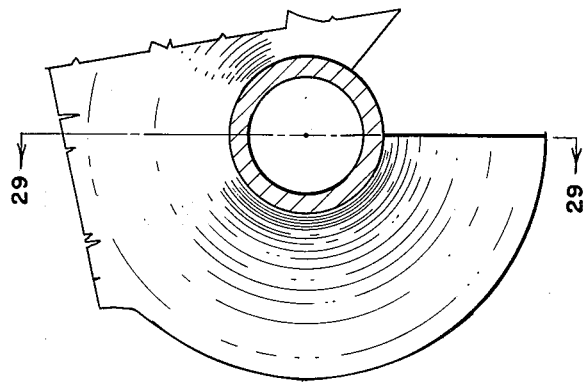
FIGURE 28 is a fragmentary view taken along the surface of the tube illustrating the disposition of the formed ribbon guide with respect to the tube.
Figure 14:
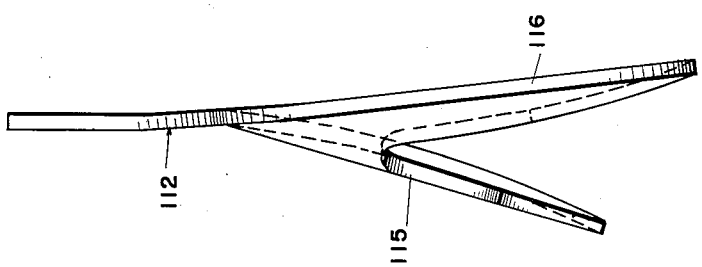
FIGURE 14 is a perspective view from the rear of the formed ribbon guide.

The mechanism for directing the ribbon as it enters the nip formed by the rolls 60 and 74 is illustrated in detail in FIGURES 9, 10 and 11 and includes a substantially L-shaped bracket 94 mounted for movement in a wedge-shaped projection integrally formed on the peripheral portion of the cover plate 67. The projection offers a plane surface provided with a keyway adapted to accommodate a key 95 on the underside of one side or leg 94' of the bracket. Extending substantially normal to one edge of leg 94' is leg 98 having a threaded opening therein. Operating handle 100 having a threaded shank, the end of which is connected to the cover plate, extends through the unthreaded opening 99 and serves to cause movement of the bracket 94 in the keyway 95. This particular adjustment permits vertical movement of the ribbon guide mechanism with respect to the tube. A third leg 96 of bracket 94 extends from a second edge of the leg 94', adjacent the first mentioned edge, substantially normal thereto. Leg 96 has provided therein an arcuate keyway 97.

Mounted for movement within the slot 97 of leg 96 is a carrier member 104, generally C-shaped in section and provided with an extension 105 projecting therefrom. The extension 105 has a key 106 on the underside and a slot 107 therethrough. The key 106 is assembled within the slot 97 for movement therein. Relative movement between the bracket 94 and carrier 104 is prevented by set screw 108 once a desired angular adjustment between the two parts has been obtained. This determines the entrance angle of the ribbon to the nip of the rolls. Assembled within the C-shaped portion of the carrier member 104 is a first bar 109, generally C-shaped in section. A second bar 110 having a projection adapted to extend partially into the notch formed in the bar 109 is assembled as shown in FIGURE 10. It will be apparent that the assembly described for directing the ribbon between the rolls 61 and 74 may be adjusted angularly and along the line of inclination of the handle 100. In operation the metallic ribbon is passed from a supply roll over a series of spaced idler rolls (not shown) designed to assist in placing the ribbon under tension, through passage 111 into the nip between rolls 61 and 74 where it is grasped by the rolls, deformed and fed upwardly about the tube in a manner to be described.

After the sheet metal ribbon has passed through the rotating forming rolls 61 and 74 it assumes a helical configuration due to the action of the rolls upon the ribbon. To direct the formed ribbon about the tube a formed ribbon guide member 112 is mounted about the tube so as to engage and direct the formed ribbon about the outer surface of the tube prior to its entrance into the forward disk assembly. A mounting bracket 113 is secured to the cover 67 and includes a guide supporting portion 114. The formed ribbon guide 112 is substantially U-shaped and is attached to the bracket portion 114 so that the legs 115 and 116 straddle the tube as it emerges through the axial opening in the roll 61 (note FIGURE 27). The formed ribbon guide 112 has a configuration that may be described generally as that of an oblique helicoid and is positioned with the leading leg 115 adjacent the exit portion of the nip so as to be engaged by the formed ribbon as it emerges from the nip and the trailing leg 116 is proximate to surface of roll 74 opposite the work engaging portion of the surface of the roll, to prevent engagement between the formed ribbon and the roll.

The ribbon engaging surface of the formed ribbon guide 112 is dished to conform to the configuration of the formed ribbon after passing through the forming rolls. The lower portion of leg 115, is inclined to a position about opposite the axis of the tube. As the concave ribbon engaging surface of guide 112 extends about the tube, the formed ribbon engages thereto. The ribbon still engages to the guide 112 as it moves over leg 116 extending down the side of the tube opposite leg 115 and is directed into the disk assembly.

Figure 27:
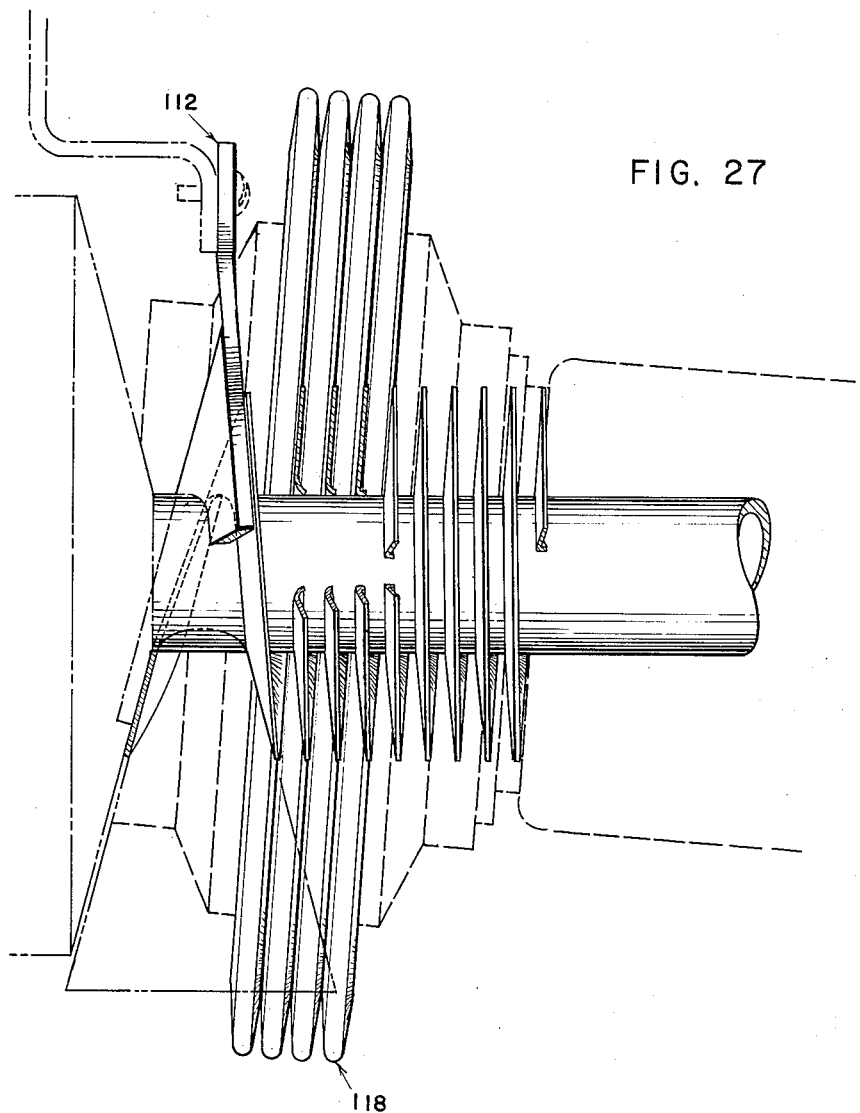
FIGURE 27 is a view from the rear of the machine showing the assembly of the ribbon about the tube as the ribbon progresses from the forming rolls, through the rotating assembly about the tube.

From an inspection of FIGURE 27 it will be evident that as the ribbon progresses along the surface of the formed ribbon guide from the portion of the guide directly above the tube to the first nip of the disk assembly a portion of a substantially conical formation is generated by the ribbon. It has been found that the angle that the ribbon forms with the tube, at the top of the tube, is of the order of about 5° and that the ribbon is dished in the manner shown.

The functions of the disk assembly 117 include stretching the ribbon along the outer edge so as to induce a stronger bond between the tube engaging inner edge of the ribbon and the outer surface of the tube to the extent that the wound ribbon will transmit movement from the disks to the tube so as cause the tube to move, by virtue of the helical fin formed thereon, in a longitudinal path while rotating, and to cause the fin to assume a nearly vertical disposition with regard to the tube as opposed to the angular inclination the spiral fin has as it engages the tube while being guided thereabout.

As more clearly shown in FIGURE 6 the rotating disk assembly 117 briefly consists of a series of axially spaced disks 118 secured to a common shaft 119 and arranged to form a series of nips through which the spirally wound ribbon or fin passes. The confronting disk surfaces 120 that form the sides of the nip are preferably provided, about the outer marginal portions thereof, with a plurality of alternately spaced radial ridges 121 and grooves 122. The extent to which these ridges and grooves extend toward the center of the disk depends upon the nature and amount of additional distortion in the form of stretching that should be applied to the ribbon to obtain a bond strong enough to drive the tube in the manner described above. The supporting structure for the rotating disk assembly includes a plate 123 secured to the vertical side of one of the head supporting channels 18. The plate includes a dove-tailed slot 124 extending longitudinally thereof for the reception of a key 125 on mounting member 126. Shelf 127 extends normal to the mounting member 126 and is connected thereto by web 126a. A dove-tailed groove 128 is provided in the upper surface of shelf 127. Slidably mounted within the groove 128 is a tongue 129 of a mounting member 130 comprising a base portion 131 and two spaced upright end portions 132 and 133. Rotatably mounted in aligned openings in the upper part of members 132 and 133 is a shaft 134 having a segment gear 135 keyed thereto.

Movement of the rotating disk assembly in a direction parallel to the axis of the machine is possible through handle 127b secured to a mounting bracket 128a secured to member 18. The handle 127b includes a threaded shank portion adapted to cooperate with a threaded recess 128b located in member 126. Set screw 129a prevents unintentional movement between members 126 and member 124 once the desired position of the rotating disk assembly has been determined.

A housing 136 in the form of a casting having a sleeve portion 138 through which the shaft 134 projects and a body portion 137 offset therefrom serves as a support for rotating disk drive mechanism. The body portion 137 has mounted therein a worm gear 139 secured to operating shaft 140 journalled in the body portion. The worm gear 139 meshes with the segment gear 135 thereby permitting angular adjustment of the housing 136 about shaft 134 through manipulation of handle 141 secured to one end of the operating shaft 140.

The action of worm gear 139 and segment gear 135 permit the rotating disk members to be moved from a position shown in FIGURE 2 wherein the axis of the disk mounting shaft is substantially parallel to the axis of the tube to a position wherein the axis of the disk members is inclined slightly with respect to the axis of the tube. It has been found that when the rotating disk assembly is adjusted so that the nips formed by the disk members coincide with the pitch of the wound ribbon that the best results the obtained.

Journalled in the end of the body portion 137 of housing 136 remote from the sleeve portion 138, is the disk mounting shaft 119 having a gear 142 keyed to the central portion thereof. The shaft 119 has an elongated end portion, projecting beyond the housing 136 and mounting a disk supporting hub 143 thereon. The disks are assembled on the hub with spacer elements (not shown) between alternate confronting surfaces thereof so as to form the ribbon or fin accommodating nips. Gear 142 meshes with a companion gear 144 keyed to a stub shaft 145 journalled in the central portion of the housing 136. The stub shaft 145 has at its free end a construction permitting a universal coupling 146 with a connecting rod 147, the other end of which is connected through a similar universal coupling 146 to stub shaft 99. Thus it will be appreciated that movement of the disks 118 will be coordinated with the movement of the form rolls 61 and 74.

It has been found that disks formed as illustrated in FIGURE 23 and FIGURE 24 produce excellent results, however, the arrangement shown in FIGURE 6 wherein a combination of flat disks and disks having the configuration shown in FIGURES 20–22 may be used.

Certain factors must be considered in determining the contour of the work or ribbon engaging faces 63 and 87 of the forming rolls 61 and 74 respectively, in accordance with one phase of the invention. As pointed out above it has been found that as the ribbon passes between the forming rolls a smooth, wrinkle-free, helical coil is formed when relative elongation of the ribbon throughout its width is effected by a pressure contact along the entire width of the ribbon by the surfaces of the rolls.

The particular configuration of the disks that may be used to form a combination can be chosen from any of the disk configurations shown in FIGURES 17 through 24 where disks are shown having opposed plane surfaces, opposed escalloped surfaces and one surface plane and one surface escalloped.

In order to provide a basis for the ensuing computations, consider for the moment, a portion or length of ribbon equivalent to one convolution of the spirally wound fin after it is assembled about the tube. Prior to its passage between the forming rolls, the portion under consideration, has a constant thickness throughout its height or width. A section through the height or width of the ribbon will be rectangular in shape. The length of the base of the portion under consideration will be equal to the circumference of the circle formed by the engagement of the base of the ribbon and the outer surface of the tube. In order to enable the top or section remote from the base of the portion to form a circle, the entire portion must be distorted by causing a relative elongation of the ribbon throughout its width or height. This is achieved by the action of the rolls without any substantial increase in the width of the ribbon. In this discussion, the terms height and width of the ribbon are used synonymously and refer to the dimension usually known as the height of the fin after the ribbon has been spirally wound about the tube to form the fin.

Neglecting the pitch of the helix formed by the fin on the surface of the tube, the extent to which the length of the outer edge of the fin of any one convolution exceeds the length of the inner edge of the fin of the same convolution may be determined by comparing the circumferences of the concentric circles generated by edges of the wound ribbon. Therefore, if L be considered the circumference of the circle defined by the inner edge, then $L_2$ may be considered the circumference of the circle defined by the outer edge of the fin throughout the same convolution. The value of L may be obtained by multiplying the outer diameter $d$ of the tube by $\pi$ and the value of $L_2$ may be obtained by multiplying the diameter D of the circle formed by the outer edge of the ribbon by $\pi$. It will be understood that the value of D will be equal to the diameter $d$, plus the height of the fin or ribbon.

The area, throughout one fin convolution, of engagement between the tube and the inner edge of the fin may be calculated by multiplying $\pi d$ by the thickness $t$ of the fin at the inner edge. With this information, the thickness T of the fin at the outer edge may be calculated by dividing the area $\pi dt$ by $\pi D$ the length of the outer edge, the calculation being based on the premise that the areas involved are equal. Thus a relationship is maintained throughout the height of the fin and the thickness at any desired vertical point may be determined.

These values are readily obtained by use of the formula $$T_1 = \frac{td}{D_1}$$

where $T_1$=the thickness at a given point in the height of the fin;

$D_1$=the diameter of the circle generated by the point during one convolution $t$=thickness of the fin at base or tube engaging edge of the fin; and $d$=diameter of the tube.

Thus a fin having a cross-sectional configuration determined in accordance with the above formula is obtained.

Accordingly it is desirable to provide the work engaging faces of the rolls with a configuration that will distort the ribbon to the extent that the desired cross sectional configuration is obtained. In addition the surface speed of the ribbon must be maintained in order to elongate the ribbon in the desired manner. Once this has been realized an arrangement will be provided whereby a given longitudinal section of ribbon of a length equivalent to form one convolution of the spirally wound fin, as determined by the circumference of the circle defined by the engagement of the edge of the ribbon with the tube, will be differentially elongated throughout its height so the edge of the ribbon remote from the tube engaging edge will define a circle, concentric to the circle formed by the inner edge.

Figure 25:
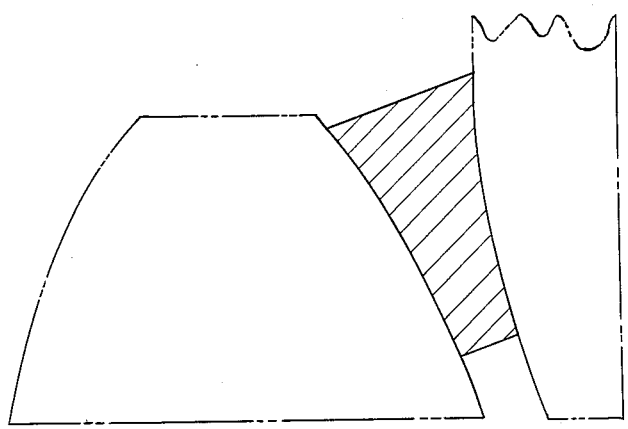
FIGURE 25 is a diagrammatic view illustrating the ribbon between a pair of forming rolls constructed in accordance with the invention wherein the width of the ribbon has been distorted in the interests of clarity.

As pointed out above, the longitudinal axis of forming roll 61 is substantially horizontal and the axis of the forming roll 74 is normal to the axis of roll 61. It has been found the axis of roll 74 should be displaced 20° from a vertical norm in a direction rearwardly of the machine. Referring more particularly to FIGURE 25 there is shown, diagrammatically, a section through the forming rolls, spaced to define a nip of the form, capable of shaping the ribbon to the desired configuration in conformance with the above fin thickness-height relationship.

In other words, using the formula mentioned above, the surface shape of each roll may be readily determined.

Figure 26:
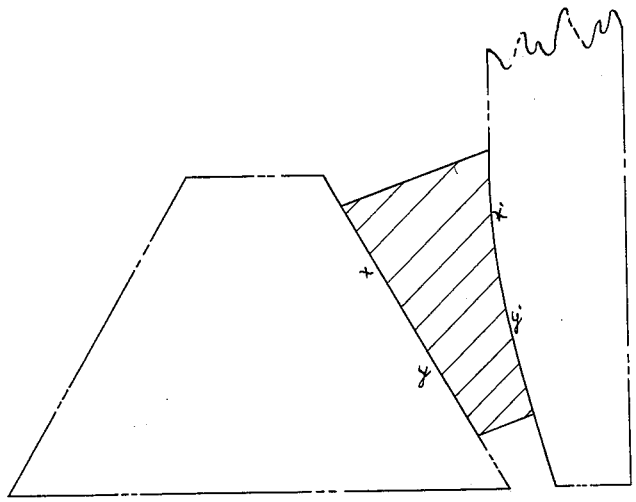
FIGURE 26 is a view similar to FIGURE 25 showing a modified pair of forming rolls.

Simply as a matter of convenience it is preferable to select one roll of a conventional shape, such as shown in FIGURE 26. The curvature will then be transferred to the other roll. It has been found that the speed ratio between the two rolls is about 3:1. Therefore, knowing the speed of each point, $x$, $y$ on the surface of roll 74, and the speed of the roll 61, the distance from the central axis of roll 74 to the points $x'$ and $y'$ may be calculated so that the surface speeds are equal. Thus, in effect, the cross-sectional area is maintained constant although the configuration is slightly changed. The curved face of roll 61 may be formed by a series of interconnected plane surfaces having different angles of inclination or it may be ground to the desired curvature as mentioned above.

The metallic ribbon, prior to the operation of the machine may be fed by hand through the ribbon directing assembly and into nip defined by the rolls 61 and 74. Proper adjustment of the width of the nip may be made through manipulation of handle 45 which moves the forming roll in the manner described above. The small motor may be used to actuate the rolls at a low speed until proper spacing is determined. Then the large motor is started for increased speed of operation.

As the ribbon emerges from the nip it assumes the helical configuration referred to above and tends to curl upwardly. Formed ribbon guide 112 serves to direct the curled ribbon about the tube into the nips formed by the forward disks where the individual turns are spaced along the tube and the spiral fin is wound about the tube.

As the ribbon emerges from between the forming rolls it tends to curl upwardly into a helical coil due to the distortion applied by the elongating action of the rolls. Formed ribbon guide 112 serves to direct the coiled ribbon about the surface of the tube to form a spirally wound fin thereon. In addition to the helical form, the surface of the ribbon is dished as a result of the action of the forming rolls. Therefore the inclination of the ribbon or fin to the tube is of the order shown in FIGURE 27, as it enters the nip formed by the first two rotating disks of the disk assembly 117.

As previously pointed out the surfaces of the confronting disks forming the nips are preferably provided with a series of alternately formed ridges and grooves. The ridges are constructed so that as they extend radially inward toward the center of the disk they taper in a direction to the center of the nip. Thus it will be obvious that the confronting ridges converge as they extend radially inward. The purpose of this construction is to cause a series of spaced indentations in the outer edge of the fin, as it enters the nip 148 resulting in an undulated section adjacent the outer edge. This action causes a further distortion of the ribbon although this distortion is confined to the outer edge of the ribbon or fin. It will be appreciated that this action involves a further stretching of the ribbon although in a different sense than that occurring when the ribbon was elongated in the forming rolls. In other words the metal is distorted out of its plane as opposed to distortion occurring in its plane.

As the fin continues through the nip the indentations are removed by the action of the next ridge inasmuch as the rideds and grooves on the confronting surfaces of the disks are offset so that a ridge on one disk surface is opposite a groove on the other disk surface. Thus the "stretch" that was created is dispersed along the edge of the fin as the rotating ridge "irons" out the undulated surface.

The elongation of the outer edge induces in the opposed edge a "curling" effect which increases the frictional bond or "hugging" action between the foot on the tube engaging edge of the fin and the tube.

Under these conditions when the disks in the rotating disk assembly are adjusted so that the nips coincide with the individual convolutions of the ribbon on the tube, the movement of the rotating disk assembly is transmitted to the tube so as to advance and rotate the tube.

An important feature of the invention involves the formation of a fin that may vary in height. A construction of this type permits the tube to be bent back upon itself at the areas having the smaller fins assembled thereon so that a finned coil having a conventional serpentine configuration may be formed. This feature is attained by virtue of the unique action of the forming rolls wherein the entire width or height of the ribbon is subjected to the longitudinal elongation necessary to form the coiled configuration.

Summarizing certain of the features of the invention I have found that when forming rolls, constructed in accordance with this disclosure, are used on machines of the type under consideration, metallic ribbon of very thin dimensions curls about the tube in such a manner that movement of the tube in the desired manner may be noted as the ribbon curls about the tube. However, when the rotating disk assembly is disposed, with respect to the axis of the tube, in the manner disclosed positive movement of the tube occurs.

In addition to the operation described above wherein a single strip is fed to the forming rolls for subsequent assembly about the tube, a plurality of strips may be fed to the rolls and applied to the tubes simultaneously in the interests of greater economy. Conventional idler rolls and slitting mechanism may also be supplied in combination with the apparatus illustrated.

In conclusion it will be apparent that apparatus of the type disclosed constructed in accordance with the principles of this invention will ensure a more economical operation through a saving in material occasioned primarily by the judicial disposition and rearrangement of the metal in the strip as it is distorted to provide the desired configuration.

While I have described a preferred embodiment of the invention, it will be understood that the invention is not limited thereto since it may be otherwise embodied within the scope of the following claims.

I claim:
1. A guide for directing a coiled strip about a tube comprising a generally U-shaped member supported in spaced relation to the periphery of the tube, said member including a strip engaging surface having a convex portion disposed below the central axis of the tube and merging upwardly into a plane surface at a point substantially normal to the said tube central axis, and becoming concave as it is generated about the periphery of the tube.

2. In apparatus for spirally winding a fin about a tube, a pair of forming elements positioned in spaced relation to one another so as to define a nip, means directing a metallic strip into said nip, guide means for directing the strip about a tube as it emerges from said nip, said last mentioned means including a generally U-shaped member disposed about the tube and being provided with leg portions extending around opposite sides of the tube so as to direct the strip up over one side of the tube and down around the other, and means for rotating said forming elements.

3. Apparatus for spirally winding a metallic ribbon about a tubular member to form an extended surface heat transfer element comprising forming rolls for distorting the ribbon to coil the ribbon into the shape of a helix, the diameter of which is substantially the same as the outside diameter of the tubular member, said forming rolls having a configuration for imparting to the ribbon a cross-sectional shape compatible with the cross-section of a given portion of the ribbon stretched around the tube, a guide member arranged adjacent the path of tube travel for directing the coiled ribbon from the forming rolls about the surface of the tubular member and a plurality of rotatably mounted disc means arranged to define at least one nip through which the coiled ribbon passes in frictional engagement with said discs, said discs being arranged at an inclination to said tubular member and being effective to mechanically bind the coiled ribbon to the tubular member whereby rotational movement of the inclined disc means may be imparted to the tube through the ribbon to advance the tube through the apparatus.

4. Apparatus according to claim 3 wherein said forming rolls are operative to engage the metallic ribbon throughout its width.

5. Apparatus according to claim 3 wherein said forming rolls include a first forming roll having a ribbon engaging surface defining a straight line when viewed in section and a second forming roll having a ribbon engaging surface defining a curved line when viewed in section.

6. In apparatus for spirally winding a sheet metal ribbon about a tube so as to form a fin thereon, power driven means for elongating the strip to cause it to assume a helical form and coil about the tube, said power driven means including first and second rolls spaced to form a nip therebetween, said first roll and said second roll being constructed to define a nip having a configuration determined by the shape of a strip of the sheet metal ribbon deformed by encirclement of the tube, a guide member for directing the formed ribbon about the tube and rotatable means for spacing the convolutions of the formed ribbon along the tube while effecting a frictional union between the tube and the ribbon sufficient to transmit the motion of the rotatable means to the tube.

References Cited in the file of this patent
UNITED STATES PATENTS

| | | |
|---|---|---|
| 908,860 | Gustavsen | Jan. 5, 1909 |
| 1,032,925 | Miller | July 16, 1912 |
| 1,417,249 | Kardong | May 23, 1922 |
| 1,738,994 | Gredell | Dec. 10, 1929 |
| 7,775,555 | Dorndorf | Sept. 9, 1930 |
| 1,850,855 | Lane et al. | Mar. 22, 1932 |
| 1,850,866 | Lane et al. | Mar. 22, 1932 |
| 1,850,936 | Lane et al. | Mar. 22, 1932 |
| 1,884,203 | Pickhard | Oct. 25, 1932 |
| 1,896,350 | Bundy | Feb. 7, 1933 |
| 1,909,704 | Morseth | May 16, 1933 |
| 1,950,623 | Owston | Mar. 13, 1934 |
| 1,992,297 | Dewald | Feb. 26, 1935 |
| 2,151,685 | Berg | Mar. 28, 1939 |
| 2,280,847 | Pitcher | Apr. 28, 1942 |
| 2,336,602 | Fulson | Dec. 14, 1943 |
| 2,374,144 | Stikeleather | Apr. 17, 1945 |
| 2,529,545 | Edwards | Nov. 14, 1950 |
| 2,604,138 | Harrison | July 22, 1952 |
| 2,613,066 | Newlin | Oct. 7, 1952 |
| 2,669,012 | Bruegger | Feb. 16, 1954 |
| 2,799,389 | Stikeleather | July 16, 1957 |
| 2,812,794 | Chapman | Nov. 12, 1957 |